Figure 1:
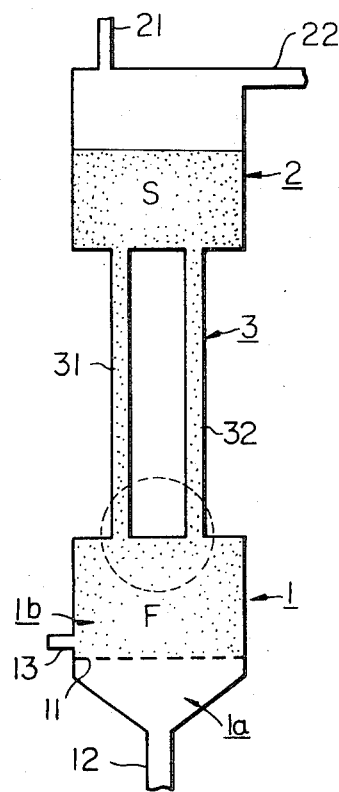

United States Patent [19]
Suzukawa et al.

[11] 3,735,498
[45] May 29, 1973

[54] METHOD OF AND APPARATUS FOR FLUIDIZING SOLID PARTICLES

[75] Inventors: Yuichi Suzukawa; Hisashi Kono; Shigeyuki Nakai; Kohei Ninomiya; Atsushi Kuribayashi, all of Ube, Japan

[73] Assignee: Ube Industries, Ltd., Yamaguchi-ken, Japan

[22] Filed: Apr. 15, 1971

[21] Appl. No.: 134,276

[30] Foreign Application Priority Data

Apr. 21, 1970 Japan..................45/33460

[52] U.S. Cl..................................34/10, 34/57 R
[51] Int. Cl.....................................F26b 17/10
[58] Field of Search..................34/57 R, 57 A, 10; 110/28 J; 122/4 D; 165/106, 108

[56] References Cited

UNITED STATES PATENTS

| | | |
|---|---|---|
| 3,615,079 | 10/1971 | Dehara et al.................165/108 |
| 2,884,373 | 4/1959 | Bailey.........................122/4 |
| 2,788,311 | 4/1957 | Howard et al................110/28 |
| 2,475,255 | 7/1949 | Rollman......................165/106 |
| 2,550,722 | 5/1951 | Rollman......................165/106 |
| 2,818,049 | 12/1951 | Blaskowski et al..........122/4 |
| 3,495,654 | 2/1970 | Jacubowiez..................34/57 X |

Primary Examiner—Kenneth W. Sprague
Attorney—Milton J. Wayne

[57] ABSTRACT

This invention relates to a method of and apparatus for fluidizing solid particles in such a manner that a large amount of the particles in circulated continuously within the subsequent fluidized bed. Such circulation phenomenon of the fluidized particles is provided in a new fluidized bed vessel having a lower chamber provided with a perforated plate for forming the fluidized bed, an upper chamber and an intermediate portion consisting of a plurality of conduits fluidly connected to both chambers. This technique may be employed effectively for catalytic reaction or sintering processes, mixing processes or drying processes of granulated particles, grain or the like, particularly for the processes requiring the transfer of a great amount of heat.

20 Claims, 14 Drawing Figures

Fig. 7
Fig. 8
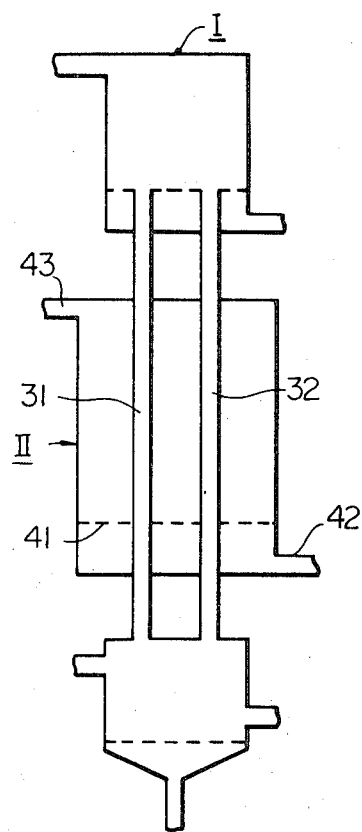
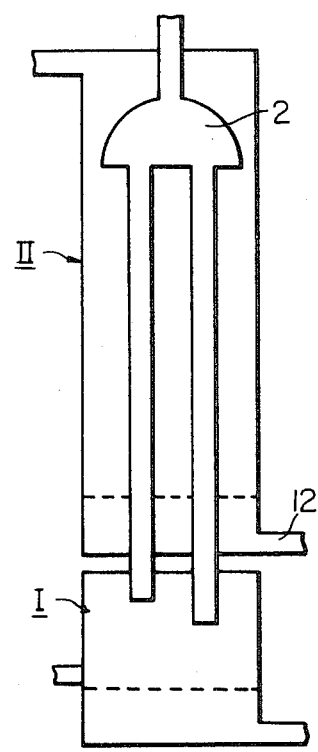

Fig. 11
Fig. 13
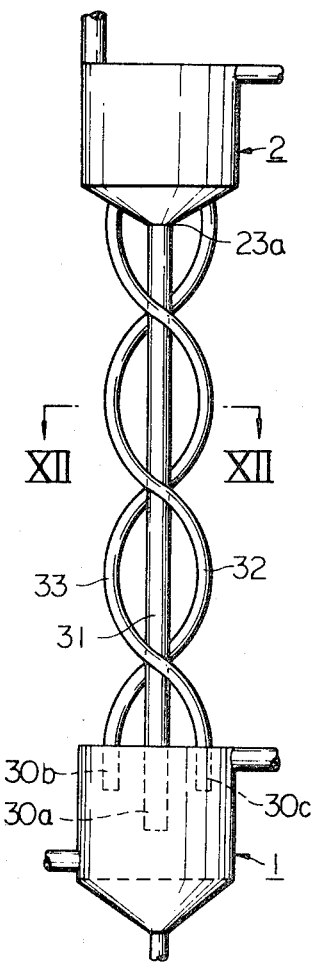
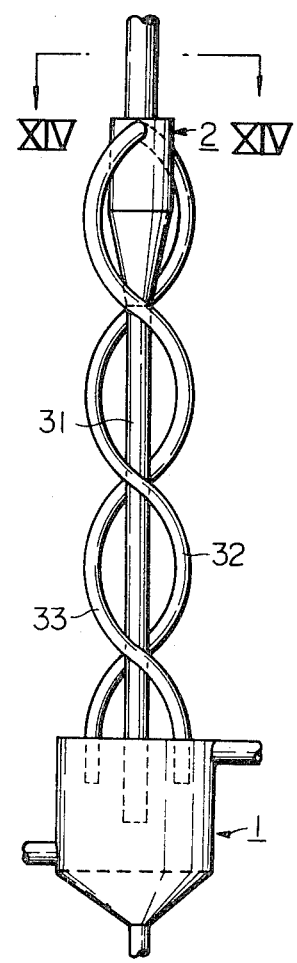
Fig. 12
Fig. 14
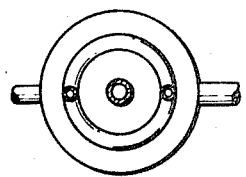
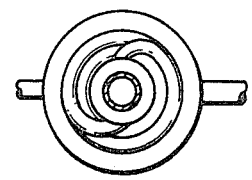

METHOD OF AND APPARATUS FOR FLUIDIZING SOLID PARTICLES

The present invention relates to an improved method and apparatus for fluidizing solid particles effectively. The invention is widely applicable for such industrial fields as catalytic reaction or sintering processes, mixing processes, or drying processes of granulated particles, grains or the like.

Conventionally, the following processes have been employed to properly fluidize solid particles to be applied to such fields as the above.

a. A conventional method as described, for example, in U. S. Pat. No. 2,874,480, wherein a gas is fed into a vessel for a fluidized bed, for example, a cylindrical chamber unit having a perforated plate in the lower portion thereof, to pass upwardly through such plate, whereby the solid particles in the chamber are fluidized to form a fluidized bed.

b. Another method, as described in U. S. Pat. No. 2,786,280, wherein a gas is injected upwardly into a vessel for fluidizing solid particles in the vessel, thereby forming a spouted bed.

c. A combined method as the above method (a) with the method (b) for fluidizing solid particles in a vessel, wherein the particles are forcibly circulated in the vessel, as indicated in Japanese Patent Gazette (41-11727) or U. S. Pat. No. 3,417,978.

d. A fluidizing method of solid particles in such a multi-staged vessel connecting the stages through downcomers as disclosed in British Patent No. 991,130, wherein the particles from the upper fluidized bed overflow into the bottom of the lower fluidized bed through the downcomers disposed therebetween.

However, the above methods have some disadvantages in the application of heat transfer from or to the fluidized bed. For example, if an exhaust gas, such as that obtained from heavy oil containing sulfur, at high temperature is employed as a fluidizing gas for drying grains or the like due to its sensible heat, the resulting dry grains are discolored and/or attachment of such impurities to the grains occurs. In a case of catalytic reaction, the catalyst's deactivation and/or mixing of the impurities into the resultant products occurs within the vessel.

In a case of heat transfer through the side walls of such a vessel of a fluidized bed, the walls of the vessel, adaptable as effective heating surfaces, are limited owing to the arrangement of the vessel.

If a plurality of small vessels of a fluidized bed are combined into one unit and their side walls are used as heating surfaces, the unit would be effective to some extent in the heat transfer rate in comparison with the unit consisting of only one fluidizing vessel, because of the increase of the surface area per unit volume.

Such a combined unit is more advantageous in view of the above, but is of a larger dimension and a more complicated arrangement and further, requires complicated operations or handling.

In such an arrangement where pipes for heat transfer, through which a heat transfer medium flows, are disposed in the fluidized bed in order to enlarge the heating surfaces, transfer of a large amount of heat from or to the fluidized bed requires a large amount of heat transfer medium, such as gas. In a case where liquid is adopted for the heat transfer medium, allowable ranges of its maximum temperature and pressure are difficult to obtain.

Electrical heating means as a heat source is undesirable for use from an economical viewpoint.

In addition to the above heating techniques, there is another heating method utilizing sensible heat of the solid particles in the fluidized bed, as described, for example, in U. S. Pat. No. 3,238,271. In this method, the particles removed from the fluidized bed to the exterior of the vessel have their sensible heat supplied or removed in another furnace, such as a regenerating furnace, and then the removed particles are again delivered into the vessel for heat transferring, and such processings are repeated.

Such a method is disadvantageous in that it requires complicated equipment to effect such transportation of a large amount of solid particles, which transportation is liable to cause mechanical difficulties.

It is an object of the present invention to provide a method and an apparatus for fluidizing solid particles whereby the above disadvantages are removed.

Briefly stated, the invention contemplates fluidization of solid particles in an apparatus comprising a vessel in such an arrangement that an upper chamber and a lower chamber are connected fluidly to a plurality of conduits, at least the lower chamber being provided with a perforated plate for forming a fluidized bed thereon, whereby the solid particles in the fluidized bed are circulated between both chambers through the conduits.

Such an invention is based upon the discovery of a new transport phenomenon in a fluidized bed, particularly that of a circulating stream of solid particles in the fluidized state within a vessel in a certain arrangement.

The discovery was made through study with the purpose of accomplishing a more effective heat transfer between the vessel of a fluidized bed and the exterior through the surfaces of the conduit pipes thereof adopted for use as the heating surface.

In such study, the following equipment was utilized in an experiment of transparent plastic material to provide the most desirable arrangement for effectively increasing the efficiency of heat transfer. The equipment comprises vertically spaced chambers of two kinds. A plurality of pipes are disposed between two chambers for connecting the two chambers fluidly therethrough. The upper chamber is provided with fluidizing gas exhaust means, while the lower chamber is provided with a conventional perforated plate for forming the fluidized bed thereon as well as feeding means for the gas.

In the equipment, a proper amount of solid particles was placed on the perforated plate and then, for effecting the fluidization of the particles, the gas was continuously fed into the lower chamber by the feeding means to pass upwardly through the perforated plate at a constant flow rate and then to flow toward the upper chamber through the pipes, while the gas was continuously discharged out of the upper chamber by the exhaust means.

At the initial unsteady state, upwardly transporting phenomenon of the particles began in some of the pipes while downwardly transporting phenomenon of the particles began in the remaining pipes. At the final steady state, such kinds of phenomena were maintained to apparently distinguish the elevating conduits of the particles from the descending conduits, and a certain amount of the solid particles in the fluidized bed was circulated within the equipment through the upper chamber, the descending conduits, the lower chamber and the elevating conduits in sequence.

Figure 2:
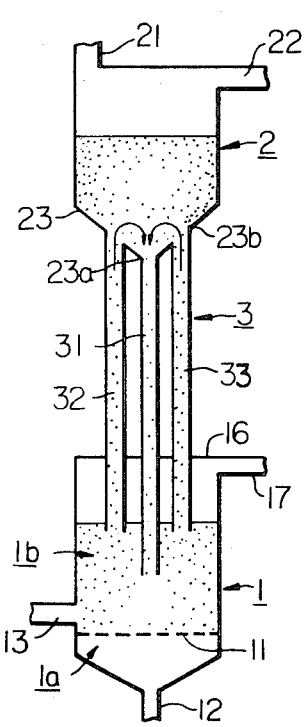
Figure 3:
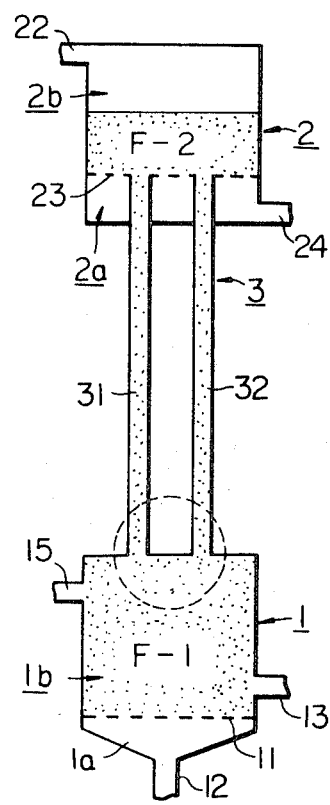
Figure 4:
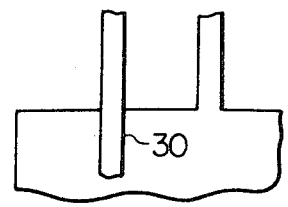
Figure 5:
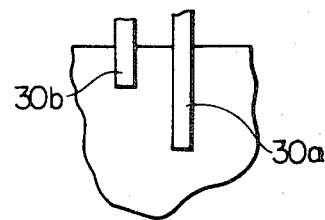
Figure 6:
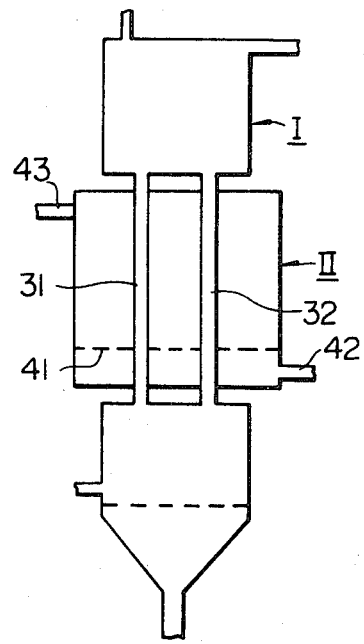
Figure 9:
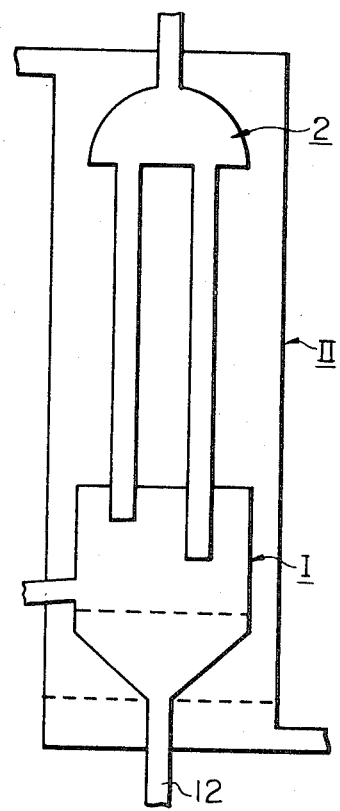
Figure 10:
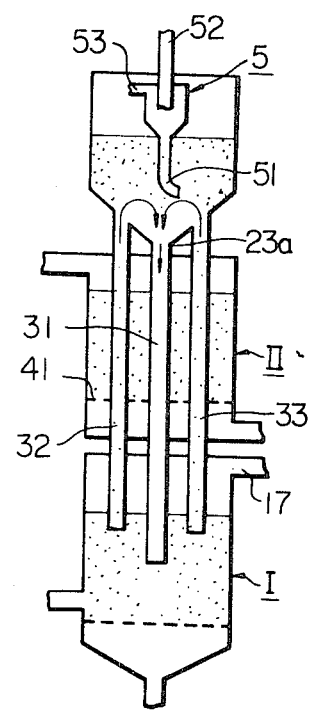

The various features of the invention will become apparent from the following detailed description set forth in connection with the accompanying drawings which relate to preferred embodiments of the invention and are given by way of illustration, in which;

FIG. 1 is a diagrammatic view of a sectional elevation depicting a vessel in accordance with the invention, FIG. 2 is a diagrammatic view of the variation of the vessel shown in FIG. 1, FIG. 3 is a diagram in a sectionally elevational view showing another type of vessel according to the invention, FIGS. 4 and 5 are enlarged diagrammatic views of modifications of the conduits in the vessels with respect to the part enclosed by the dotted circles in FIGS. 1 and 3, respectively, FIG. 6 shows one embodiment of an apparatus of the invention for which the vessel of FIG. 1 is employed, FIG. 7 shows another embodiment of an apparatus of the invention, for which the vessel of FIG. 3 is employed, and FIGS. 8 and 9 show modifications of the apparatus of FIG. 6, respectively, FIG. 10 shows another modification of the apparatus of FIG. 6, wherein a cyclone is disposed in an upper chamber, of which the bottom is a reversed cone shape, FIG. 11 is an elevational view of the modified vessel of FIG. 2, wherein spiral conduits are employed as elevating conduits, FIG. 12 is a sectional view taken along the line XII—XII in FIG. 11, FIG. 13 is an elevational view of the modified vessel of FIG. 11, wherein a cyclone is employed as the upper chamber, and FIG. 14 is a plan view of the vessel in FIG. 13.

With reference to FIG. 1, a vessel of the first type has a lower portion 1, an upper portion 2 and an intermediate portion 3. The lower portion 1 is of a vessel- or chamber-type and is provided with a perforated plate 11 in the usual arrangement for separating it into two sections 1a and 1b. The lower section 1a is of a funnel-type for feeding a fluidizing gas thereinto through a gas inlet 12. The upper section 1b is a cylindrical chamber for containing solid particles and forming a fluidized bed therein. Numeral 13 denotes an outlet for removing the solid particles according to the need for further processing. The upper portion 2 is of a vessel- or chamber-type and is equipped with an inlet 21 for feeding the solid particles therein at the upper side and an exhaust outlet 22 of the gas near the upper side. The intermediate portion 3 consists of a plurality of conduits, such as thin pipes of substantially the same dimensions, disposed between the lower chamber 1 and the upper chamber 2 fluidly connecting these chambers (in FIG. 1 only two conduits are illustrated for convenience of explanation). The vertical conduits 31 and 32 are terminated at the upper flat side of the lower chamber 1 and at the lower flat side of the upper chamber 2 to open therethrough, respectively.

In the arrangement, a fluidizing gas fed into the lower section 1a of the lower chamber through the gas inlet 12 passes upwardly into the upper section 1b through the perforated plate 11 and flows upwardly from the upper section 1b to the upper chamber 2 through the vertical pipes 31 and 32, and is finally discharged out of the upper chamber to the exterior through the exhaust gas outlet 22. In such a process, the gas effects a fluidization of a proper amount of solid particles delivered in the vessel through the particle inlet 21 and thus, a fluidized bed is formed within the upper section 1b of the lower chamber 1. The particles in such a fluidized bed are elevated, in the fluidized state, from the upper section 1b to the upper chamber 2 through vertical pipe 31 or 32. The elevated particles effect a fluidization of the solid particles within the upper chamber 2 to form a spouted bed therein and then descend in the fluidized state from the upper chamber 2 to return to the lower chamber 1 through conduit 32 or 31, that is, a different conduit from that of the elevating passage.

Accordingly, a circulating stream containing a certain amount of particles is created between both chambers.

The circulation developing process will now be described in detail.

In the initial process, the gas passing through the conduits 31 and 32 flows upwardly together with the solid particles in the fluidized bed F of the lower chamber 1. However, a difference between gas velocities in both conduits is produced owing to the difference between the fluid resistances to the gas in both conduits. Particularly, at the beginning only a slight difference between the gas velocities is produced spontaneously in spite of the conduits having the same substantial dimensions.

Now, assuming that the gas flowing through one conduit 31 is slightly ahead of the gas in the other conduit 32, in the sense of velocity, at the initial stage, the solid particles flow through the conduit 31 at a higher increasing velocity, while the velocity of the particle stream through the other conduit 32 flows at a lower decreasing velocity. In this connection, so-called "transported phase of the solid particles" is created in the conduit 31 while the other conduit 32 tends to prevent such phenomenon. Consequently, the difference between the fluid resistances increase between both conduits accordingly, and eventually, the conduit 31 creates a distinct upward transport of the particles in the fluidized bed of the lower chamber 1 to the upper chamber 2, while the other conduit 32 exhibits a state wherein the fluidized particles in the upper chamber 2 descend toward the lower chamber 1 through the conduit 32. Thus, the solid particles in both chambers are fluidized, respectively, and simultaneously are interchanged through both conduits to create the circulating stream of particles in a fluidized state.

With reference to FIG. 1, a vessel involving only two conduits has been described. However, such a vessel having five conduits or more is preferable for practical use. In such cases, of course, at least one conduit serves as an elevating conduit, while the remaining conduits serve as descending conduits.

A "blow-through phenomenon" or an "entrainment phenomenon" of the particles with tendencies causing the particles to leave the upper chamber through the exhaust outlet 22 may be effectively prevented by means of the well-known baffle or the inserting-type cyclone (see Daizo Kunii & Octane Levenspiel; Fluidization Engineering, p. 408, 1969) disposed in the upper chamber 2, as shown in FIG. 10.

The bottom of the upper chamber may be formed in a reversed cone-type, for example, as shown in FIG. 2. Further, as described hereinafter, the vessel may be even more improved with respect to the fluidized state by adoption of an upper chamber with an additional perforated plate therein for flowing an additional gas into the upper chamber through the plate.

With reference to FIG. 3, the vessel has a lower chamber 1, an upper chamber 2 and an intermediate portion consisting of a plurality of conduits 3, respectively, similar to the components of the vessel in FIG. 1, and the reference numerals identified with the numerals in FIG. 1 denote the equivalent or similar components or means. However, there are some substantial differences between both types of vessels.

The upper chamber 2 shown in FIG. 3, has two sections 2a and 2b which are separated by a second perforated plate 23 disposed therein, and is provided with a second gas inlet 24 near its bottom for feeding a second fluidizing gas to pass upwardly through the perforated plate 23.

In addition, a feeding inlet 15 for the solid particles is disposed at the upper section 1b of the lower chamber 1 near the top thereof, while such kind of inlet 21 in the vessel of FIG. 1 is located in the upper chamber thereof. A plurality of vertical conduits 31 and 32 of the intermediate portion 3 extend upwardly through the bottom of the upper chamber 2 and are terminated at the second perforated plate 23 opening upwardly therethrough.

In the arrangement of the vessel shown in FIG. 3, a first gas fed into the lower section 1a through the first gas inlet 12 passes upwardly into the upper section 1b through the first perforated plate 11, as described in the case of FIG. 1. In such a process, the first gas effects a fluidization of a great amount of solid particles delivered into the vessel through the particle inlet 15 of the upper section 1b and thus, a first fluidized bed (F-1) is formed within the upper section 1b and the first gas continuously flows up to the upper section 2b of the upper chamber 2 through the vertical conduits 31 and 32.

Simultaneously, a second gas is introduced into the lower section 2a through the second gas inlet 24 of the upper chamber 2 thereafter, to flow upwardly into the upper section 2b through the second perforated plate 23. The resultant mixture of the first gas with the second gas within the upper section 2b is discharged out of the upper chamber 2 to the exterior through the exhaust outlet 22.

At the initial unsteady state, a portion of the particles in the fluidized bed (F-1) is elevated through vertical conduit 31 or 32 and carried into the upper section 2b. Consequently, the upward flow of the first gas and the upward flow of the second gas through the second perforated plate 23 effect formation of a second fluidized bed (F-2) within the upper section 2b. Simultaneously, a portion of the particles in the second bed (F-2) descends in the fluidized state through an opposite conduit 32 or 31 returning to the first bed (F-1), and thus, in the stationary state established, a circulating stream of a constant rate of the solid particles is created between both chambers 1 and 2. In operation, a great amount of solid particles is circulated within the vessel through the upper section 1b of the lower chamber, the established elevating conduit, the upper section 2b of the upper chamber and the established descending conduit in sequence, while the first fluidized bed and the second fluidized bed are maintained in their respective chambers.

As set forth in the case of FIG. 1, such a circulating stream phenomenon of solid particles within the vessel at the steady state is caused firstly by a slight difference between the fluid resistances of the upward flow of the first gas carrying the solid particles through the vertical conduits 31 and 32, which occur spontaneously even if the conduits have the same substantial dimensions, and secondly by the development of such difference, which leads to distinguishing of at least one conduit exhibiting "transported phase of solid particles" from the remaining conduits preventing such phenomenon.

A preferable circulation of the solid particles between both chambers 1 and 2 may be accomplished by adjusting an average gas velocity in the conduits 31 and 32, sufficiently to ten times or more, relative to the minimum fluidizing velocity. The second gas introduced directly into the upper chamber 2 effects a more preferable state of the second bed in the upper chamber 2 in comparison with such case of no second gas as in FIG. 1.

In this example also, only two conduits are arranged in the vessel for convenience of explanation. However, preferably, five or more conduits may be employed for practical use. The plurality of conduits may be provided in such a preferable manner, that a ratio of a total of cross-sectional areas of the conduits to a horizontally-sectional area of the lower chamber 1 is 1/25 or more.

Such a ratio results in a very preferable state of the first fluidized bed (F-1) in the lower chamber 1.

In such two kinds of vessels as described above, the circulating stream of the particles is produced evenly in the same dimensioned conduits which have no downward extensions from the top of the lower chamber 1 as shown in FIGS. 1 and 3. Alternatively, an improvement of such circulation may be attained by a modified arrangement regarding the part indicated by the dotted circles in FIGS. 1 and 3. In such arrangement, at least one of the conduits has a downward extension 30 from the upper wall of the lower chamber 1 as shown in FIG. 4, or all of the conduits extend downwardly through the upper wall of the lower chamber with different extensions 30a and 30b in depth as shown in FIG. 5, or at least one of the conduits is of a different diameter from the others.

The above arrangements may effect a forced difference of the fluid resistances in the conduits. Further, the above arrangements result in the passing of a larger amount of gas through the conduits and further increases the amount of the circulated particles. In such cases, the difference between the extensions from the top of the lower chamber may be preferably about 50 mm or more. About two-tenths to seven-tenths of all the conduits may preferably be adopted for the descending conduits effecting the downward solid particle flow therethrough.

In addition to the above variations or irrespectively, some modifications of the vessel may be made to intensively promote the circulation phenomenon and thereby, to exhibit a more preferable state of the fluidized bed in the resultant vessel, as follows.

In FIG. 2, some different arrangements of a vessel are provided with respect to the conduits and the bottom of the upper chamber, in comparison to the vessel in FIG. 1.

The modified upper chamber 2 has a bottom of a cone-shape projecting downwardly, instead of the flat bottom in FIG. 1. All of the conduits 31, 32 and 33 are fluidly connected with the upper chamber 2 and the lower chamber 1 and additionally, extend downwardly into the upper section 1b of the lower chamber 1 in an arrangement where one of the conduits 31 is located at the bottommost part or bottom central portion 23a of the cone 23 so as to form a funnel, while the other conduits 32 and 33 are symmetrically located at the slopes 23a, 23b respectively. The central conduit 31 has the longest downward extension from the upper flat wall 16 of the lower chamber 1. The symmetrical conduits 32 and 33 have the same downward extensions.

Number 17 denotes an additional exhaust gas outlet disposed at the upper portion of the lower chamber for removing a part of the gas introduced into the lower chamber.

The removing operation through the additional outlet 17 enables the gas velocity in the conduits to decrease and thus, allows relatively smaller size particles to be used and also enables the particle velocity in the elevating conduits to decrease. Consequently, attrition of the particles as well as of the inner surfaces of the conduits can be prevented by the above operation.

In the arrangement, the central conduit 31 is defined to serve effectively as the descending conduit for intensively transporting the particles downwardly therethrough and the opposite conduits are defined to serve as effective elevating conduits. In the process, the cone of the upper chamber effects a tendency of the particles, in the spouted bed (S) within the upper chamber 2, to move toward the bottommost part 23a, thereby the circulating movement of the particles being promoted within the upper chamber 2.

In FIG. 2, only three conduits, one of which extends from the bottommost part of the cone, are shown for convenience of explanation. However, employment of five or more conduits, some conduits of which are arranged circumferentially near the bottommost part of the cone to serve as descending conduits, is preferable for practical use. Alternatively, a larger diameter conduit may preferably be located at the bottommost part of the cone for serving as only one descending conduit instead of the above circumferential arrangement near the bottommost part.

Curved conduits may also be employed for creating such a forced circulating stream as described above instead of the vertical conduits, that is, for serving as the descending or elevating conduits.

Modified vessels having such curved conduits are shown in FIGS. 11, 12, 13 and 14, repectively.

In FIG. 11, the conduits fluidly connected to the lower chamber 1 and te upper chamber 2 of a reversed cone-shape similar to that of FIG. 2, consist of a vertical conduit 31 and curved conduits 32 and 33.

The vertical conduit 31 extends from the bottommost part 23a of the upper chamber 2 to the center of the top wall of the lower chamber and has an additional extension 30a from the top of the lower chamber thereinto. The curved conduits 32 and 33 encircle the vertically central conduit 31 in a symmetrically spiral arrangement and have additional extensions 30b and 30c from the top of the lower chamber thereinto, respectively.

Both extensions of the spiral conduits are the same in length and are shorter than that of the central conduit.

In this arrangement, the spiral conduits 32 and 33 serve as elevating conduits, while the vertical conduit 31 serves as the descending conduit.

As to the shape of the conduits, the function of the conduit depends upon the physical characteristics of the solid particles such as particle size and angle of repose, and the descending conduits may be preferably designed so as to allow the solid particles to descend spontaneously by their own gravity.

The other modified vessel shown in FIG. 13 has similar types of conduits as that of FIG. 11 and a cyclone 2 utilized as the upper chamber. The cyclone 2 is employed for preventing the escape of solid particles together with the fluidizing gas to be discharged in such a manner, that the escaping particles are caught and then recovered.

FIGS. 12 and 14 show cases where two elevating conduits and one descending conduit are arranged. However, such an arrangement of three elevating conduits or more and one descending conduit is also possible.

In the apparatus shown in FIG. 14, a total of the cross-sectional areas of all the conduits may be defined as being larger than the cross-sectional area of the upper chamber, while the other apparatus in FIGS. 1, 2, 3 and 4 have no such definition.

In the two kinds of vessels set forth, a great amount of particles is circulated through the thin conduits in the fluidized state. Accordingly, the surfaces of such conduits may be employed as heating surfaces.

An apparatus having a function of heat transfer from or to the fluidized bed, in which such types of vessels are incorporated respectively, may effect a desirable heat transfer operation without any difficulty under suitable conduit arrangement, with respect to number, diameter, length and material.

Such apparatus will now be fully described with reference to FIGS. 6, 7, 8, 9 and 10. Similar vessels to that in FIGS. 1 and 3 are arranged in the apparatus of FIGS. 6 and 7, respectively.

A similar vessel as that of FIG. 2, but additionally having the inserted cyclone 5 in the cone-shaped upper chamber as previously described, is arranged in the apparatus of FIG. 10.

In each apparatus, an additional vessel II for heat transfer has a perforated plate 41 therein and is incorporated with the main vessel (hereinafter referred to as main vessel I) in such arrangement that the vessel II encloses the plurality of conduits 31 and 32 of the main vessel I and the conduits extend through the bottom, the perforated plate 41 and the top of the enclosing vessel II.

In addition to the perforated plate 41, the enclosing vessel II has a gas inlet 42 near the bottom thereof and an exhaust outlet 43 near the top thereof to serve as another vessel for fluidizing the bed of other solid particles on the perforated plate 41 by gas feed from the gas inlet 42.

In a case where fluidized beds are formed in respective vessels, heat transfer is greatly effected through the conduits contacting both fluidized beds simultaneously. Of course, even in a case where a fluidized bed is formed in only the main vessel I, a higher rate of heat transfer can be attained in comparison with the conventional apparatus.

The enclosing vessel II may be disposed to enclose only the intermediate portion consisting of the conduits as shown In FIGS. 6, 7 or 10. Alternatively, such an arrangement enclosing not only the conduits, but also the upper chamber 2 as shown in FIG. 8 or enclosing the whole body of the main vessel I as shown in FIG. 9, may be adopted to minimize a heat loss. In a case of comparatively great temperature difference between the enclosed conduits and the enclosing vessel II, it is necessary to absorb a strain or distortion which in caused by the difference of the thermal expansions in both vessels I and II. Therefore, it is desirable to absorb such thermal strain through additional absorbing means such as a so-called "expansion ring" mounted on the side wall of the enclosing vessel II or mounted on the conduits of the main vessel I. However, serious problems involved in the absorption of the thermal strain are, weakness of such means against the heat as well as against the mechanical forces and high cost from an economical viewpoint.

Under the circumstances, such apparatus as shown in FIGS. 8 and 9 being similar to "travelling head type" are preferable. In this case, a problem of sealing space between the enclosing vessel II and the exhaust outlet 22 of the main vessel I, which extends upwardly through the top of the enclosing vessel II, is easily solved by the use of a labyrinth packing. Such apparatus is advantageous because there is no need to utilize a complicated arrangement and further, effective absorption of the thermal strain is produced in the apparatus.

Particularly, in a case of introducing a fluidized gas at high temperature through the gas inlet 12, the apparatus of FIG. 8 is economically preferable, as well as preferable from the viewpoint of heat resistance of the equipment, due to the facts that the lower chamber 1 of the main vessel I must be made of refractory bricks and further, is required to be of a compact type.

In a case of the apparatus wherein the whole body or both the upper chamber 2 and the conduits of the main vessel I are contained within the enclosing vessel II, the upper chamber 2 of an upper semi-spherical form, as shown in FIGS. 8 and 9, is preferable for reinforcing the upper chamber more effectively.

In the examples shown in FIGS. 8 and 9, no particle inlets for delivering the particles into the vessel are provided respectively, and the gas outlet 22 of the upper chamber serves both as the gas outlet and as the particle inlet.

As will be understood, the apparatus according to the invention has desirable features in that its arrangement is very simple and provides considerably larger heating surfaces therein as well as possesses characteristics involved in the fluidized bed the same as for the conventional apparatus.

If the apparatus of the invention is employed for such processes requiring transfer of a great amount of heat for heating, heat recovery, catalytic reaction, thermal cracking of hydrocarbon, sintering, cooling and drying, excellent results are obtained.

The following examples indicate embodiments of the fluidizing vessels and the apparatus comprising such a vessel in accordance with the invention.

EXAMPLE 1

Solid particles were fluidized in a similar type of vessel made of transparent plastic material, to that shown in FIG. 1, utilizing the following conditions.

Dimensions and process conditions of the vessel:

A lower chamber (diameter × height); 300 mm$\phi$ × 150 mm

An upper chamber (diameter × height); 300 mm$\phi$ × 850 mm

| | | |
|---|---|---|
| Vertical conduits; | number | 5 |
| | Diameters of outside and inside | 34 mm$\phi$ 28 mm$\phi$ |
| | height | 3000 mm |
| A perforated plate; | number of holes | 60 |
| | diameter of each hole | 2 mm$\phi$ |
| Solid particles; | material | boron phosphate |
| | particle size | 100–500 $\mu$ |
| | amount | 12 kg |
| | minimum fluidizing velocity | 9 cm/sec |
| A fluidizing gas (air); volume rate of fluid | | 44.2 m³/hr |

As a result of the fluidization of the solid particles due to the air, through the walls of the vessel, a circulating stream of the solid particles between the lower chamber and the upper chamber was observed, in such a process that four of the five conduits served as elevating conduits to effect upward transportation of the fluidized particles in the lower chamber to the upper chamber, thereby a fluidization of the particles occurring in the upper chamber, while the remaining conduit served as a descending conduit to effect downward transportation of the resultant fluidized particles in the upper chamber to the lower chamber. Measurements showed it to be 420 kg/hr in the amount of circulated particles and 4 m/sec in average velocity of the air base on the total cross-sectional areas of the conduits.

EXAMPLE 2

A similar type of apparatus to that shown in FIG. 6 was employed to effect heat transfer between a fluidized bed in the main vessel I and the exterior through the walls of the conduits used as heating surfaces. In the apparatus, a combustion exhaust gas at high temperature was continuously fed through the gas inlet 12 into the vessel I to pass upwardly through the perforated plate 11 for fluidizing a bed of solid particles thereon and discharged out of the main vessel through the exhaust outlet 22, while other solid particles in the enclosing vessel II was fluidized by air introduced through the gas inlet 42 to pass upwardly through the perforated plate 41, whereby the air to be discharged out of the vessel II through the exhaust outlet 43 was heated during its stay in the vessel II.

Dimensions of the above apparatus and process conditions are indicated in Table 1 and the results are shown in Table 2.

TABLE 1

Main Vessel I

| | | |
|---|---|---|
| A lower chamber (diameter × height) | | 300 mm$\phi$ × 600 mm |
| An upper chamber (diameter × height) | | 300 mm$\phi$ × 1600 mm |
| Vertical conduits | material | 25 Cr-20Ni steel |
| | number | 14 |
| | diameters of outside and inside | 40 mm$\phi$, 32 mm$\phi$ |
| Solid particles | material | magnesia |
| | amount | 65 kg |
| | particle diameter | 0.3–1 mm$\phi$ |
| | minimum fludizing velocity | 32 cm/sec |
| A perforated plate | number of holes | 9 |
| | diameter of each hole | 17.3 mm$\phi$ |
| Fluidizing gas (combustion exhaust gas); volume rate of fluid | | 127 Nm³/hr |

Enclosing Vessel II

| | | |
|---|---|---|
| A vessel (diameter × height) | | 300 mmφ × 3500 mm |
| Solid particles | material | mullite |
| | amount | 90 kg |
| | particle diameter | 1–2 mmφ |
| | minimum fluidizing velocity | 85 cm/sec |
| Fluidizing gas (air); volume rate of fluid | | 153 Nm³/hr |

TABLE 2

Main Vessel I

| | | |
|---|---|---|
| Temperatures of the combustion exhaust gas | | |
| | at the gas inlet | 1300°C |
| | at the gas outlet | 630°C |
| | in the lower chamber | 770°C |
| Amount of circulated particles | | 870 kg/hr |
| Average velocity of the combustion gas based on the total cross-sectional areas of the conduits | | 10.3 m/sec (630°C) |

Enclosing Vessel II

| | | |
|---|---|---|
| Air temperature | at the air inlet | 20°C |
| | at the air outlet | 580°C |
| "Superficial gas velocity in a column" in the fluidized bed | | 2.5 m/sec (580°C) |

EXAMPLE 3

The same apparatus as in Example 2 was employed for gas-to-gas heat transfer utilizing the same conditions as in Example 2 except for the following.

Air at the volume rate of fluid of 100 Nm³/hr was used for the main vessel I instead of combustion exhaust gas at 127 Nm³/hr, while combustion exhaust gas at 160 Nm³/hr was used for the enclosing vessel II instead of air at 153 Nm³/hr, whereby the air in the main vessel was heated, contrary to the case of Example 2. The results are shown in Table 3.

TABLE 3

Main Vessel I

| | | |
|---|---|---|
| Air temperatures | at the air inlet | 20°C |
| | at the air outlet | 430°C |
| | in the lower chamber | 320°C |
| Amount of circulated particles | | 605 kg/hr |
| Average velocity of the air based on the total cross-sectional areas of the conduits | | 6.33 m/sec (430°C) |

Enclosing Vessel II

| | | |
|---|---|---|
| Temperatures of the combustion exhaust gas | | |
| | at the gas inlet | 700°C |
| | at the gas outlet | 450°C |
| "Superficial gas velocity in a column" in the fluidized bed | | 2.2 m/sec (450°C) |

EXAMPLE 4

A fluidized state of solid particles was observed through the walls of a similar type of vessel made of transparent plastic material, to that shown in FIG. 3, utilizing the following conditions.

Dimensions and process conditions of the vessel:

A lower chamber (diameter × height); 300 mmφ ×150 mm

An upper chamber (diameter × height); 300 mmφ × 850 mm

| | | |
|---|---|---|
| Vertical conduits | | |
| | number | 5 |
| | diameters of outside | 34 mmφ |
| | and inside | 28 mmφ |
| | height | 3,000 mm |
| First perforated plate in the lower chamber | | |
| | number of holes | 72 |
| | diameter of each hole | 2 mmφ |
| Second perforated plate in the upper chamber | | |
| | number of holes | 60 |
| | diameter of each hole | 2 mmφ |
| Solid particles | | |
| | material | mullite |
| | particle diameter | 100–500 μ |
| | amount | 15 kg |
| First fluidizing air fed into the lower chamber | | |
| | volume rate of fluid | 48 Nm³/hr |
| Second fluidizing air fed into the upper chamber | | |
| | volume rate of fluid | 14 Nm³/hr |

As a result of fluidization of the solid particles due to both airs, a circulating stream of the particles between both chambers was observed in such a state that only one conduit served as the descending conduit.

Very preferable fluidizations were exhibited in both chambers, respectively. Measurements showed it to be 460 kg/hr in the amount of circulated particles and 4.3 m/sec in average velocity of the air based on the total cross-sectional areas of the conduits.

EXAMPLE 5

A modified apparatus of Example 4 was applied utilizing the same conditions as those of Example 4 except for the following conditions.

As shown in FIG. 4 only one of the fine conduits was adopted for use, extending downwardly into the lower chamber through the top thereof. Solid particles in an amount of 15 kg was used and a fluidizing air at 68 m³/hr was fed into the lower chamber.

As a result, a violent circulation of great amount of the solid particles between the lower chamber and the upper chamber was observed in such a state that, only a conduit having the downward extension from the top of the lower chamber served as the descending conduit, while the remaining conduits having no such downward extensions as the former, served as the elevating conduits.

Measurements showed it to be 730 kg/hr in the amount of the circulated particles and 6.1 m/sec in the average velocity of the air based on the total cross-sectional areas of the conduits.

EXAMPLE 6

A similar type of apparatus to that shown in FIG. 7 was applied for effecting the heat transfer between the main vessel I and the enclosing vessel II through the walls of the conduits as the heating surfaces.

In the apparatus, combustion exhaust gases at high temperature, respectively, fed to the lower chamber and the upper chamber in the main vessel I to pass upwardly through the respective perforated plates and the resultant mixture of both gases, were discharged out of the upper chamber, whereby first and second fluidized beds in good states were formed in respective chambers with a circulating stream of solid particles between both chambers through the conduits. In the above state of the main vessel I, the other gas was fed to the enclosing vessel II and discharged out of same after passing upwardly through the perforated plate therein for effecting a fluidization of the other solid particles on the plate. In this process, the other gas was heated by heat transmission through the walls of the conduits enclosed by the produced fluidized bed in the vessel II.

Dimensions of the above apparatus and the process conditions are indicated in Table 4, and the results are shown in Table 5.

TABLE 4

Main Vessel I

| | |
|---|---|
| A lower chamber (diameter × height) | 300 mmφ × 600 mm |

| | |
|---|---|
| An upper chamber (diameter × height) | 300 mmφ × 1600 mm |
| First perforated plate in the lower chamber | |
|     number of holes | 9 |
|     diameter of each hole | 17.3 mmφ |
| Second perforated plate in the upper chamber | |
|     number of holes | 60 |
|     diameter of each hole | 2 mmφ |
| Vertical conduits | |
|     material | 25 Cr-20 Ni steel |
|     number | 14 |
|     diameter of outside and inside | 40 mmφ, 32 mmφ |
| Solid particles | |
|     amount | 65 kg |
|     particle diameter | 0.3–1.0 mmφ |
|     minimum fluidizing velocity | 32 cm/sec |
| First combustion gas fed to the lower chamber | 130 Nm³/hr |
| Second combustion exhaust gas fed to the upper chamber | 30 Nm³/hr |

Enclosing Vessel II

| | |
|---|---|
| Vessel (diameter × height) | 300 mmφ × 3500 mm |
| Solid particles | |
|     amount | 90 kg |
|     particle diameter | 1–2 mmφ |
|     minimum fluidizing velocity | 85 cm/sec |
| Fluidizing air | |
|     volume rate of fluid | 150 Nm³/hr |

TABLE 5

Main Vessel I

| | |
|---|---|
| Temperatures of the combustion exhaust gas (first and second gas) | |
|     at each gas inlet | 1300°C |
|     at the gas outlet | 640°C |
| Amount of circulated particles | 940 kg/hr |
| Average velocity of the gas based on the total cross-sectional areas of the conduits | 10.8 m/sec (680°C) |

Enclosing Vessel II

| | |
|---|---|
| Air temperatures | |
|     at the air inlet | 20°C |
|     at the air outlet | 610°C |
| "Superficial gas velocity in a column" in the fluidized | 2.54 m/sec (610°C) |

EXAMPLE 7

A modified apparatus of FIG. 8 with such modified conduits as in FIG. 5, was employed for effecting the heat transfer between the conduits and the upper chamber of the main vessel I, and vessel II enclosing the above conduits and upper chamber through the walls thereof used as the heating surfaces. In the apparatus, a combustion exhaust gas at high temperature was continuously fed into the lower chamber of the main vessel I to pass upwardly through the perforated plate therein, while it was continuously discharged out of the upper chamber. Solid particles in the vessel I were carried from the lower chamber to the upper chamber by the gas flowing through certain conduits having the shorter downward extensions form the top of the lower chamber and then descended from the upper chamber to the lower chamber through the other conduits having the longer downward extensions.

In such a process, a circulating stream of the particles occurred between both chambers, while good fluidized beds were formed in both chambers, respectively. In this state, air was introduced into the enclosing vessel II to pass upwardly through the perforated plate therein for effecting a fluidization of the other solid particles on the plate and was discharged. Consequently, the air in the enclosing vessel II was heated by the heat transmission through both walls of the conduits and the upper chamber enclosed by the fluidized bed formed by the air.

Dimensions and process conditions of the above apparatus and the results are indicated in Tables 6 and 7, respectively.

TABLE 6

Main Vessel I

| | |
|---|---|
| A lower chamber (diameter × height) | 300 mmφ × 600 mm |
| An upper chamber (diameter × height) | 300 mmφ × 1000 mm |
| A perforated plate in the lower chamber | |
|     Number of holes | 9 |
|     Diameter of each hole | 17.3 mmφ |
| Vertical conduits | |
|     Material | 25 Cr-20 Ni steel |
|     Number of elevating conduits | 10 |
|     Number of descending conduits | 4 |
|     Length of each conduit between both chamber | 2500 mm |
|     Extensions length of each elevating conduit | 100 mm |
|     Extensions length of each descending conduit | 200 mm |
| Solid particles | |
|     Amount | 50 kg |
|     Particle diameter | 0.3–1.0 mmφ |
|     Minimum fluidizing velocity | 32 cm/sec |
| Fluidizing combustion exhaust gas, volume rate of fluid | 155 Nm³/hr |

Enclosing Vessel II

| | |
|---|---|
| Vessel (diameter × height) | 420 mmφ × 4000 mm |
| Solid particles | |
|     Amount | 120 kg |
|     Particle diameter | 0.5–1.0 mmφ |
|     Minimum fluidizing velocity | 45 cm/sec |
| Fluidizing air, volume rate of fluid | 184 Nm³/hr |

TABLE 7

Main Vessel I

| | | |
|---|---|---|
| Temperatures of the combustion exhaust gas | | |
|     at the gas inlet | | 1300°C |
|     at the gas outlet | | 650°C |
| Amount of circulated particles | | 2900 kg/hr |
| Average velocity of the gas based on the total cross-sectional areas of the conduits | | 12.9 m/sec (650°C) |

Enclosing Vessel II

| | | |
|---|---|---|
| Air temperature | at the air inlet | 20°C |
| | at the air outlet | 590°C |
| "Superficial gas velocity in a column" in the fluidized bed | | 1.35 m/sec (590°C) |

EXAMPLE 8

Heat exchange was carried out in a similar apparatus to that of FIG. 10 between the enclosed vessel II and the main vessel I which had the reversed cone-shaped upper chamber 2 and the inserted cyclone 5 in the upper chamber 2. When a combustion exhaust gas at high temperature was introduced into the main vessel I to fluidize solid particles therein, the gas flew up together with a portion of the solid particles through the shorter conduits 32 and 33 and flew up into the cone-shaped upper chamber 2. The solid particles, which were blown up, moved toward the bottommost part 23a and then descended through the central conduit 31 to the lower chamber 1.

The exhaust gas, which was blown up, was introduced through the pipe 53 into the cyclone 5 together with a portion of the solid particles, and was separated from the particles, thereafter to be discharged out of the cyclone to the exterior through the exhaust outlet 52. Simultaneously, the separated particles were discharge out of the cyclone 5 through the particle outlet 51 and then moved to the bottommost part 23a. The recovered particles from the cyclone 5 were returned to the lower chamber together with the other portion of the particles which were not introduced into the cyclone 5.

Such movement of the solid particles and the combustion exhaust gas effected the circulating stream of the particles between both chambers through the conduits.

While the above process in the main vessel I was carried out, air was introduced into the enclosing vessel II to fluidize the other solid particles on the perforated plate 31 thereof and the air was heated by the heat transmission through the walls of the conduits mainly via the other particles in the enclosing vessel II.

Dimensions and process conditions of the above apparatus and the results are indicated in Table 8 and Table 9, respectively.

TABLE 8

Main Vessel I

| | |
|---|---|
| A lower chamber (diameter × height) | 300 mmφ × 800 mm |
| An upper chamber (diameter × height) | 300 mmφ × 1500 mm |
| Vertical angle of the reversed cone-shaped portion | 90°C |
| Height from the top of the lower chamber up to the bottommost part of the upper chamber | 4000 mm |
| Central vertical conduits (arranged at and near the bottommost part of the upper chamber) | |
| Number | 8 |
| Additional length from the top of the lower chamber | 450 mm |
| Diameter of outside and inside | 40 mmφ 32 mmφ |
| Surrounding vertical conduits (arranged around the central conduits) | |
| Number | 6 |
| Additional length from the top of the lower chamber | 400 mm |
| Diameters of outside and inside | 40 mmφ 32 mmφ |
| A perforated plate in the lower chamber | |
| Number of holes | 9 |
| Diameter of each hole | 17.3 mmφ |
| Solid particles Material | Magnesia |
| Amount | 54 kg |
| Particle diameter | 0.3–1.0 mmφ |
| Minimum fluidizing velocity | 32 cm/sec |
| Combustion exhaust gas | |
| Temperature at the inlet | 1300°C |
| Volume rate of fluid | 140 Nm³/hr |

Enclosing Vessel II

| | |
|---|---|
| Vessel (diameter × height) | 300 mmφ × 3500 mm |
| Solid particles Material | Mullite |
| Amount | 90 kg |
| Particle diameter | 1–2 mmφ |
| Minimum fluidizing velocity | 85 cm/sec |
| Fluidizing air Temperature at the inlet | 20°C |
| Volume rate of fluid | 160 Nm³/hr |

TABLE 9

Main Vessel I

| | |
|---|---|
| Temperature of the combustion exhaust gas; at the outlet | 660°C |
| Average velocity of the gas based on the total cross-sectional areas of the conduits; | 11.8 m/sec (660°C) |
| Amount of circulated particles between both chamber; | 1600 kg/hr |

Enclosing Vessel II

| | |
|---|---|
| Temperature of the air at the outlet | 600°C |
| "Superficial gas velocity in a column" | 2.7 m/sec (600°C) |

EXAMPLE 9

Solid particles were fluidized in a similar type of vessel made of transparent plastic material, to that shown in FIG. 11, utilizing the following condition and the resultant fluidized state was observed.

Dimensions of the vessel and the process conditions:

A lower chamber (diameter × height); 300 mmφ × 600 mm

An upper chamber (diameter × height); 300 mmφ × 1000 mm

A vertical angle of the reversed cone-shaped portion 90°

Height from the top of the lower chamber up to the bottommost part of the upper chamber; 3000 mm Spiral conduits (arranged circumferentially with diameter of 240 mmφ);

| | |
|---|---|
| Number | 6 |
| Spiral arrangement | |
| Encircling number | 4 |
| Pitch | 660 mm |
| Coil diameter | 240 mmφ |
| Length in an uncoiled state from the bottom slope of the upper chamber to the flat top of the lower chamber | 4480 mm |
| Additional length from the flat top of the lower chamber | 390 mm |
| Diameter of outside | 34 mmφ |
| and inside | 28 mmφ |
| A vertical conduit (located at the center of the circumferential arrangement) | |
| Length from the bottommost part of the upper chamber to the flat top of the lower chamber | 3000 mm |
| Additional length from the flat top of the lower chamber | 440 mm |
| Diameter of outside | 114 mmφ |
| and inside | 100 mmφ |
| A perforated plate in the lower chamber | |
| Number of holes | 72 |
| Diameter of each hole | 2 mmφ |
| Solid particles Material, | Boron phosphate |
| Particle diameter | 100–500μ |
| Minimum fluidizing velocity | 5 cm/sec |
| A fluidizing gas Material | Air |
| Volume rate of fluid | 117 Nm³/hr |

As a result of the process in that the air was introduced through the inlet of the lower chamber and discharged out of the upper chamber through the outlet thereof, a circulation of the solid particles elevating through the spiral conduits, which had shorter additional extensions and descending through the vertical conduit which had a longer additional extension, was observed through the transparent walls of the vessel.

Amount of circulated particles was 2,900 kg/hr, and "superficial gas velocity in a column" in the lower chamber and all the conduits were 0.46 m/sec and 2.8 m/sec, respectively.

EXAMPLE 10

A similar type of vessel made of transparent material to that shown in FIG. 13 was employed to examine the resultant circulation of the solid particles under the following conditions.

Dimensions of the vessel and the process conditions:

| | |
|---|---|
| A lower chamber; same dimensions as those of Example 9 | |
| An upper chamber of a cyclone type (diameter × height); | 200 mmφ × 600 mm |
| Spiral conduits; same dimensions as those of Example 9 | |
| A vertical conduit; | |
| Length from the bottommost part of the upper chamber to the flat top of the lower chamber | 2600 mm |
| Other dimension; same as those of Example 9 | |
| Solid particles Amount | 13 kg |
| Material, particle size and minimum fluidizing velocity; same as those of Example 9 | |
| Other dimensions and process conditions; same as those of Example 9 | |

As a result of the fluidizing operation, a similar fluidized state as that of Example 9 was exhibited. In the upper cyclone the solid particles were separated favorably from the air to be discharged, and the resultant circulated particles descended smoothly through the vertical conduit to the lower chamber.

What we claim is:

1. An apparatus for fluidizing solid particles comprising a vessel, provided with at least one inlet and at least one exhaust outlet for a fluidizing gas, an inlet for said particles and at least one perforated plate for forming a fluidized bed thereon, having (a) a lower chamber separated by said perforated plate into a lower section, in which said gas inlet is located, and an upper section, (b) an upper chamber, in which said exhaust outlet is located, and (c) an intermediate portion consisting of a plurality of conduits fluidly connected to said lower chamber and said upper chamber, a total of cross-sectional areas of said conduits being less than cross-sectional areas of said lower chamber, and the bottom of said upper chamber, from which said conduits extend downwardly, being of a cone shape projecting downwardly.

2. An apparatus according to claim 1, wherein one of said conduits is located at the bottommost part of said cone.

3. A method of fluidizing solid particles in a vessel having an arrangement comprising a lower chamber provided with a perforated plate for forming a fluidized bed thereon, an upper chamber and an intermediate portion consisting of a plurality of conduits fluidly connected between said lower chamber and said upper chamber comprising flowing a fluidized gas into said lower chamber to pass upwardly through said perforated plate and said conduits to be discharged from said upper chamber;

feeding said solid particles into said chamber arrangement to be fluidized by said gas;

the flowing of said fluidized gas through one of said conduits being at a higher velocity than the flow through said one conduit creating upward transport of said solid particles, and the lower velocity flow through said other conduits creating a downward transposrt of said solid particles;

the upward and downward transport creating a circulating stream of solid particles throughout said conduits and said said chambers; and discharging said fluidized solid particles from said lower chamber.

4. A method according to claim 3 including flowing a second fluidized gas into said upper chamber through a second perforated plate therein, and mixing said second gas with said first-named gas to provide the fluidizing of said solid particles.

5. A method according to claim 4 in which a first fluidizing bed is formed above said first-named perforated plate by said first-named gas flow, a second fluidized bed is formed above said second perforated plate by said second gas flow, and the velocity flow through said conduits is adjusted to be at least ten times more than the flow in the fluidizing beds.

6. A method according to claim 3 including discharging part of said gas flow from said lower chamber.

7. A method according to claim 3 in which part of said gas flow in said conduits is guided to flow in a spiral path.

8. Apparatus for fluidizing solid particles comprising
a lower chamber having a predetermined cross-sectional area and including a fluidizing gas inlet;
a perforated plate extending across said lower chamber to provide an upper section and a lower section, said gas inlet located in said lower section to flow gas therethrough to form a fluidized bed above said perforated plate in said upper section;
an upper chamber having a discharge outlet for said gas;
a plurality of conduits interconnecting said lower chamber and said upper chamber to provide a connected arrangement for gas flow therethrough;
said arrangement including an inlet for the reception of solid particles to be circulated therethrough;
a solid particle discharge outlet located in said upper section of said lower chamber; and
said conduits having a combined cross-sectional area less than said predetermined cross-sectional area of said lower chamber.

9. Apparatus according to claim 8 in which said solid particle inlet is located in said upper chamber.

10. Apparatus according to claim 8 in which a second perforated plate extends across said upper chamber, a second gas inlet is provided in said second chamber below said second perforated plate to form a second fluidized bed above said second perforated plate, and said conduits extend into said upper chamber to terminate at said second perforated plate.

11. Apparatus according to claim 10 in which said solid particle inlet is located in said upper section of said lower chamber.

12. Apparatus according to claim 8 in which one of said conduits has a cross-sectional area that varies in size from the cross-sectional area of any other conduit.

13. Apparatus according to claim 8 in which said conduits extend into said upper section of said lower chamber.

14. Apparatus according to claim 13 in which the length of the extension of one of said conduits is greater than the length of any other conduit.

15. Apparatus according to claim 8 in which a second gas outlet is provided in said upper section of said lower chamber.

16. Apparatus according to claim 8 in which at least two of said conduits have a spiral shape, and at least one other conduit extends vertically to be surrounded by said spiral conduits.

17. Apparatus according to claim 16 in which said conduits extend into said upper section of said lower chamber, and said vertical conduit extends further into said upper section than said spiral conduits.

18. Apparatus according to claim 8 in which a vessel encloses part of said arrangement to provide heat transfer thereto, said vessel including a further perforated plate therein, another gas inlet at its bottom portion, and another gas outlet at an upper portion thereof.

19. Apparatus according to claim 18 in which said vessel encloses only said conduits.

20. Apparatus according to claim 18 in which said vessel encloses said conduits and said upper chamber.

* * * * *

UNITED STATES PATENT OFFICE
CERTIFICATE OF CORRECTION

Patent No. 3,735,498                     Dated May 29, 1973

Inventor(s) Yuichi Suzukawa, Hisashi Kono, Shigeyuki Nakai, Kohei Ninomiya, Atsushi Kuribayashi It is certified that error appears in the above-identified patent and that said Letters Patent are hereby corrected as shown below:

In Claim 3, line 16: change "said one conduit" to --the others of said conduits--.

Signed and sealed this 16th day of April 1974.

(SEAL)
Attest:

EDWARD M. FLETCHER, JR.
Attesting Officer

C. MARSHALL DANN
Commissioner of Patents